H. C. BANWELL.
HOLDER FOR MANIFOLDING SALES BOOKS.
APPLICATION FILED JUNE 22, 1909.
1,088,054.
Patented Feb. 24, 1914.
3 SHEETS—SHEET 1.
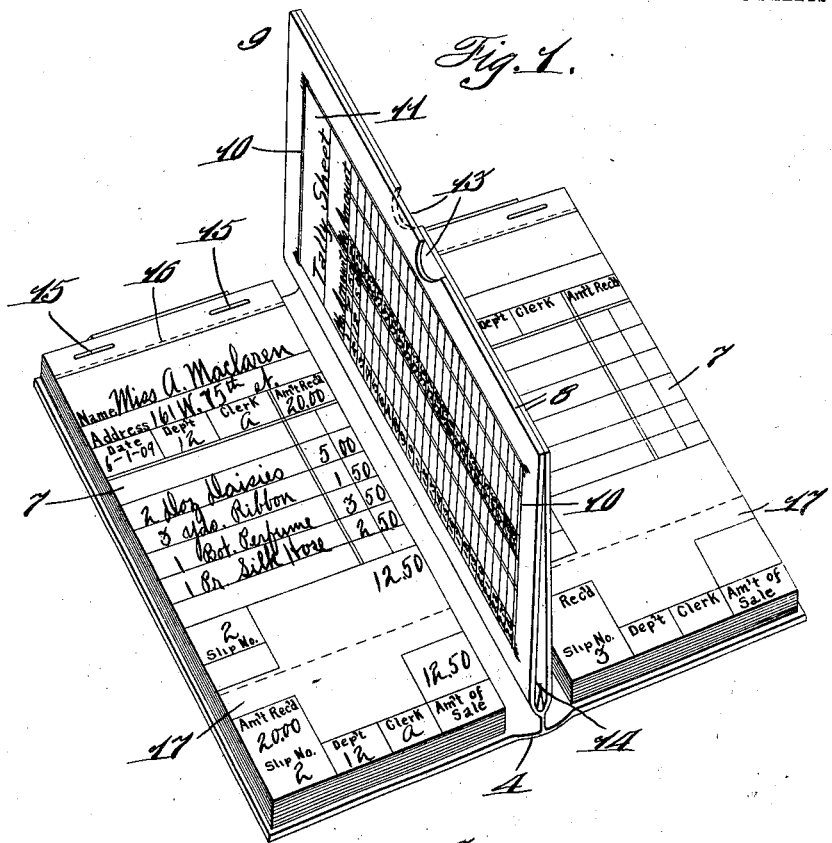
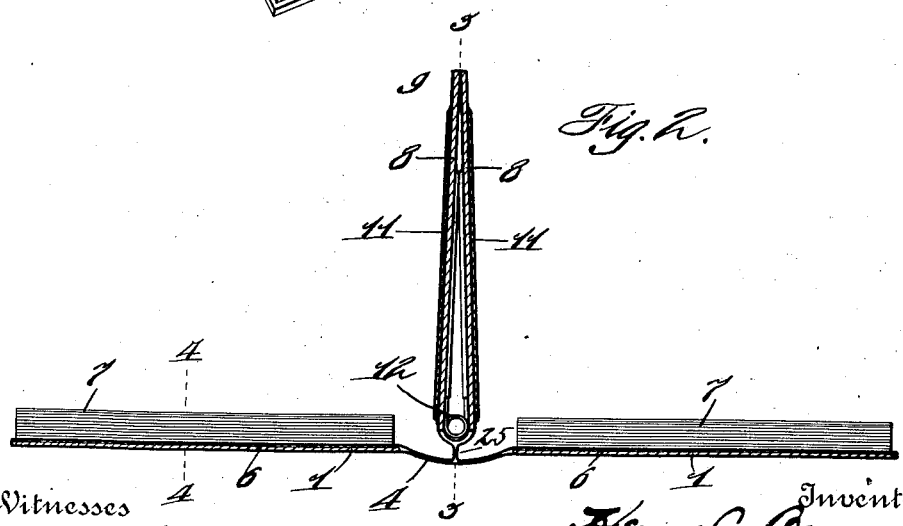

H. C. BANWELL.
HOLDER FOR MANIFOLDING SALES BOOKS.
APPLICATION FILED JUNE 22, 1909.

1,088,054.

Patented Feb. 24, 1914.
3 SHEETS—SHEET 2.

Fig. 3.

Fig. 4.

Witnesses

Inventor
Henry C. Banwell
By
and
Attorneys

H. C. BANWELL.
HOLDER FOR MANIFOLDING SALES BOOKS.
APPLICATION FILED JUNE 22, 1909.
1,088,054.
Patented Feb. 24, 1914.
3 SHEETS—SHEET 3.
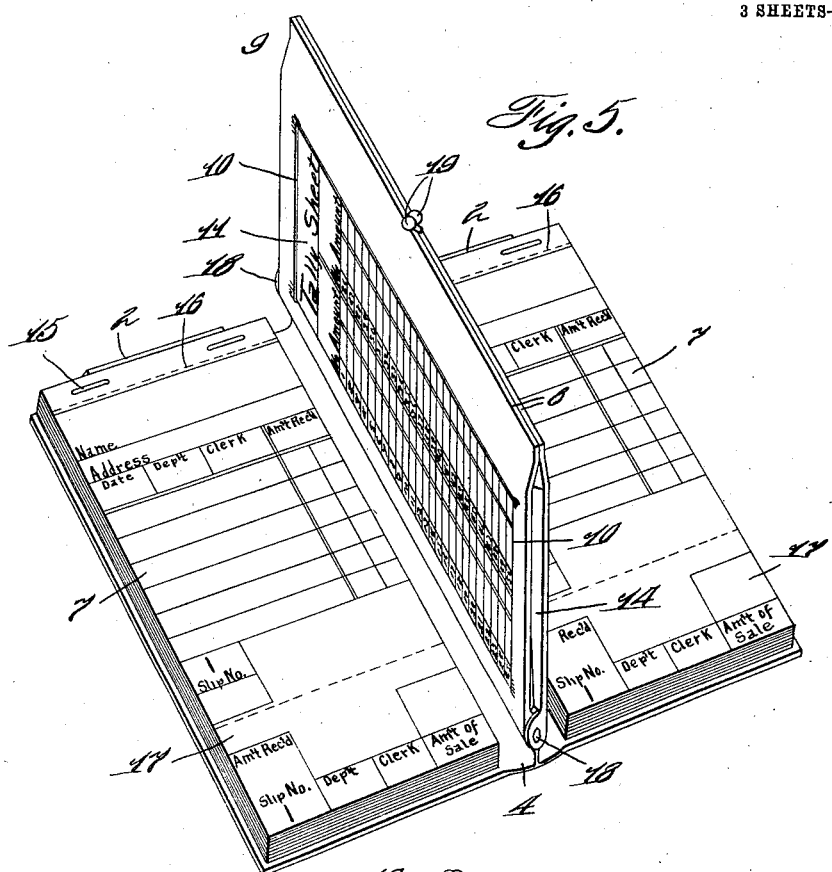
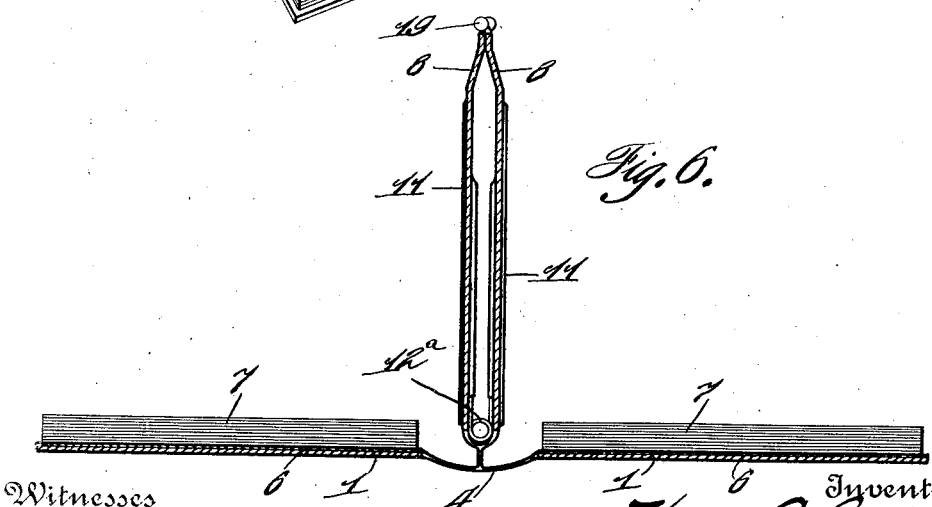

UNITED STATES PATENT OFFICE.

HENRY C. BANWELL, OF CHICAGO, ILLINOIS, ASSIGNOR TO THE NATIONAL CASH REGISTER COMPANY, OF DAYTON, OHIO, A CORPORATION OF OHIO, (INCORPORATED IN 1906.)

HOLDER FOR MANIFOLDING SALES-BOOKS.

1,088,054.

Specification of Letters Patent.  Patented Feb. 24, 1914.

Application filed June 22, 1909. Serial No. 503,597.

*To all whom it may concern:*

Be it known that I, HENRY C. BANWELL, a subject of the King of Great Britain and Ireland, residing at Chicago, in the county of Cook and State of Illinois, have invented certain new and useful Improvements in Holders for Manifolding Sales-Books, of which I declare the following to be a full, clear, and exact description.

This invention relates to holders for manifolding sales books.

The principal object of this invention is to provide a sales book holder with a receptacle for sales slips, coupons or vouchers which are returned to and retained by the clerk. In many large business houses when a sale is made, the transaction is entered in detail upon a sales slip and through suitable transferring material duplicated upon a second slip; a voucher attached to either the original or duplicate slip is also made out with a summary of the transaction. These slips and voucher with the goods and money are sent to an inspector, who sees that the goods correspond to the entries upon the slips, and then wraps up the goods with one of the slips, while the other slip with the voucher and the money are sent to the cashier. The cashier returns the voucher to the inspector who in turn forwards it to the clerk with the goods. This voucher is retained by the clerk and is a check upon the cashier, while the slip retained by the cashier is a check upon the clerk. A number of stores using this system consider the preservation of all slips and vouchers of such importance to their auditing force that they impose a fine upon the employee responsible for any slips or vouchers which are missing. Owing to the present loose method of preserving these vouchers, which in some instances are filed upon a pin file or kept in an envelop detached from the sales book holder, considerable hardship is forced upon the clerk by the loss of some or all of the vouchers. By the use of the improved receptacle which forms the principal object of this invention, this danger of losing the vouchers or slips is reduced to a minimum.

The sales book described above forms no part of the invention and instead of the voucher a third slip may be used or any desired form of sales book may be employed.

With these and incidental objects in view, the invention consists in certain novel features of construction and combination of parts the essential elements of which are set forth in appended claims and a preferred form of embodiment of which is hereinafter described with reference to the drawings which accompany and form part of this specification.

Of said drawings: Figure 1 is a perspective view of the invention. Fig. 2 is a transverse sectional view. Fig. 3 is a section taken on line 3—3 of Fig. 2, showing the spring in full lines. Fig. 4 is a section taken on line 4—4 of Fig. 2. Fig. 5 is a perspective view showing a modification of the invention. Fig. 6 is a transverse sectional view of Fig. 5.

The back of the holder is formed of stiff card board or sheet metal plates 1, having their upper ends bent at right angles as at 2. These plates are covered on one side and partly on the other by leatherette or other suitable material 3, as shown in Figs. 2 and 4, which is extended so as to form a flexible hinge 4 intermediate said plates, see Figs. 1 and 2. The leatherette covering 3 does not cover the whole of the plates 1 but a small portion of each plate is left uncovered at its upper inside surface (see Fig. 4) so that the card board back 6 of each book 7 may be inserted at this point in the pocket 5 formed by the covering 3 and the inside of plate 1 which is perfectly obvious and well known in the art to which this invention pertains. The angle portions 2 of the plates 1 form stops for the books 7 when placed in said holder to prevent the accidental displacement of said books.

The books 7 are or may be used for the purpose of recording different classes of transactions, such as cash and credit sales and may be of different colors so as readily to identify the different transactions.

Projecting inwardly from the center of the flexible hinge 4 is a portion 25 of the leatherette covering 3, which passes around sides 8 of a slip receptacle 9. These sides 8 may be of the same material as the plates 1 and the covering 3 is cut near the top and bottom of each side to form slots 10 into which the ends of tally cards or sheets 11 are projected and thus securely held in place, see Figs. 1 and 4. A coil spring 12 is located in the bottom of the receptacle 9 and the ends thereof pass upwardly between the covering 3 and each side 8 of the receptacle 9, as shown in Fig. 3. The spring 12 is tensioned so as normally to force the upper ends of the sides together. Owing to the thinness of the leatherette covering and the fact that the power of the spring through the ends thereof is constantly exerted against said covering to keep the slip receptacle 9 closed it is necessary to turn the free ends of the springs so that the same may form a more extended and better bearing surface and thereby reduce to a minimum the danger of the ends of the spring tearing through the leatherette covering.

To facilitate the opening of the slip receptacle 9, each side 8 has a notch 13 cut out of its upper edge in which the clerk may insert his thumb and forefinger and by slightly twisting same open the receptacle against its spring tension to permit the insertion of a stub or slip. As the clerk removes his hand, the upper ends of the receptacle will spring together and thus securely hold the slips therein, the top and bottom of said receptacle being provided with a suitable form of binding 14, as shown in Figs. 1 and 3.

The slips of each book 7 are suitably bound at one end to the card board back 6 by staples 15 and are arranged to be detached therefrom along the weakened line 16. As shown in Fig. 1 the voucher 17, which is returned to and retained by the clerk, is attached to the original slip, but, as previously stated, the book 7 forms no part of the present invention and instead of the voucher a triplicate slip may be used, and other forms of book may be employed with equal success.

In Figs. 5 and 6 a modification of the invention is shown. In these figures the sides 8 are shown as hinged together at 18 and each side upon its upper edge provided with a knob 19 overlapping each other. The spring 12ª of the modification is tensioned so as to force the slip receptacle open but such action of the spring normally is prevented by the knobs 19, which in order to pass each other require the springing of the hinged portions 18 of the receptacle, the tension of the spring 12ª not being great enough to accomplish this. As the clerk in opening the receptacle forces the knobs past each other, the spring will come into play and complete the opening of said receptacle, the extent of the opening being limited by the bellows fold partition 14 connecting the sides of the receptacle. The receptacle 9, as shown in the modification, is shaped so as to hold the intended number of slips without bulging the sides thereof, thereby preventing the inserted slips from aiding the spring 12ª to force the receptacle open, which would be the case if the spring and knobs of the modification were shown attached to the receptacle illustrated in Figs. 1 and 2.

While the form of mechanism herein shown and described, is admirably adapted to fulfil the objects primarily stated it is to be understood that it is not intended to confine the invention to the one form of embodiment herein disclosed, for it is susceptible of embodiment in various forms all coming within the scope of the claims which follow.

What is claimed is:

1. A sales book cover having means for holding a sales book while entries are being made thereon, and provided with a slip-receptacle pivotally mounted on said cover in juxtaposition to the book holding means, said receptacle having a spring therein controlling the operation thereof.

2. A cover for sales books, having means on the front and back portions thereof for supporting books, and a pivotally mounted slip receptacle located between the front and back portion.

3. A sales book cover having means for supporting a book thereon and provided with a slip receptacle also mounted thereon in juxtaposition to the book-supporting means, the said receptacle having a coiled spring mounted therein, the ends of which bear against the receptacle sides for producing relative movement between the sides.

4. A sales book cover having means for supporting books on the front and back portions thereof, and a pivotally mounted slip receptacle adapted to be opened and closed located between the front and back portions, the said receptacle having a coiled spring for forcing the sides of the receptacle to an open position and devices for preventing the opening action of said spring.

5. A cover for sales books comprising a main portion adapted detachably to hold a sales book, a voucher receptacle having pivotally connected sides, pivotally connected to one edge of the main portion and adapted to be opened and closed, means for retaining the voucher receptacle in closed position, and means for opening the voucher receptacle.

6. A cover for sales books, having a main portion adapted detachably to hold a sales book, a voucher receptacle having pivotally connected sides, pivotally connected to one edge of the main portion adapted to be opened and closed, and a spring mounted in the voucher receptacle with its two ends extending toward the mouth of the same, and connected with its two sides respectively, tending to cause relative movement between them.

7. A cover for sales books, having a main portion adapted detachably to hold a sales book, a voucher receptacle having pivotally connected sides adapted to be opened and closed, and pivotally connected to one edge of the main portion, and a spring mounted in the bottom of the voucher receptacle with its two ends extending toward the mouth of the same and bent at their ends to form extended bearing surfaces lying against and parallel with the respective pivotally connected sides of the receptacle, and tending to cause relative movement between them.

8. A cover for sales books, comprising front and back portions each adapted detachably to hold a sales book, a voucher receptacle having pivotally connected sides adapted to be opened and closed, and pivotally connected between the front and back portions, the pivotally connected sides being each provided with two slits near the upper and lower ends respectively, a tally card mounted on each of the sides in the slits therein, and means tending to cause relative movement between the sides of the voucher receptacle.

9. A cover for sales books, comprising front and back portions, each adapted detachably to hold a sales book, and connected at their adjacent edges by a flexible portion, said flexible portion having a second flexible portion extending therefrom at one side and terminating in a voucher receptacle.

10. A cover for sales books, comprising two relatively stiff front and back portions, each having a pocket to receive the back of a sales book, and connected at their adjacent edges by a flexible portion, said flexible portion having a laterally extending portion terminating in two parts connected at their ends, to form a voucher receptacle, and means for retaining the voucher receptacle in closed position.

11. A cover for sales books, comprising two relatively stiff main members, each covered on one side and partly covered on the other by a flexible covering so as to form on the partly covered side between the stiff member and the covering a pocket for receiving the back of a sales book, said relatively stiff members being separated at their adjacent edges and connected by the covering which forms a flexible hinge connecting the members, the connecting flexible hinge being provided with a flexible lateral extension terminating in separated portions, each portion covering a stiff member which with thin coverings form the two sides of a voucher receptacle, and means for retaining the sides of the receptacle in closed position.

12. A cover for sales books, having means on the front and back portions thereof for supporting books, and a pivotally mounted slip receptacle located between the front and back portions and connecting with the cover only at its pivotal connection therewith.

13. A cover for sales books, having front and back portions pivotally connected at adjacent edges each having means for supporting a book, and a slip receptacle arranged between said front and back portions and pivoted to both at the place of their pivotal connection.

In testimony whereof I affix my signature in the presence of two witnesses.

HENRY C. BANWELL.

Witnesses:
  WILLIAM R. LORD,
  OTTO E. STYBOR.